United States Patent Office 3,528,928
Patented Sept. 15, 1970

3,528,928
PROCESS OF BREAKING OIL-IN-WATER EMULSIONS
Brian M. Rushton, Edina, Minn., assignor to Petrolite Corporation, Wilmington, Del., a corporation of Delaware
No Drawing. Original application Mar. 25, 1965, Ser. No. 442,793. Divided and this application Jan. 13, 1969, Ser. No. 790,877
Int. Cl. B01d *17/04;* C08g *20/26;* C23f *11/14*
U.S. Cl. 252—341                6 Claims

ABSTRACT OF THE DISCLOSURE

Process for breaking oil-in-water emulsions wherein the emulsions are treated with amino-amido polymers characterized by being a reaction product of at least a polyamide and an acrylate-type compound having the formula

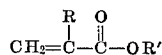

where R is hydrogen or methyl and R' is methyl, ethyl, propyl, isopropyl, butyl, sec-butyl, tert-butyl, aryl or hexyl, or a cross-linked reaction product.

---

This application is a division of my copending application Ser. No. 442,793, filed on Mar. 25, 1965, now U.S. Pat. No. 3,445,441.

This invention relates to polymers formed by reacting an unsaturated carboxylate with a polyamine; and to uses therefor.

These polymers are characterized by both amido and amino groups. In their simplest embodiments they may be represented by units of the following idealized formula:

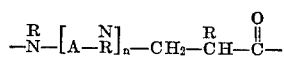

where the R's, which may be the same or different, are hydrogen or a substituted group, such as a hydrocarbon group, for example alkyl, alkenyl, alkinyl, aryl, etc. and A is a moiety of the polyamine which, for example, may be aryl, cycloalkyl, alkyl, etc., and *n* is an integer such as 1–10 or greater.

The above simplified formula represents a linear polymer. However, cross-linked polymers may also be formed by employing certain conditions since the polymer has labile hydrogens which can further react with either the unsaturated moiety by adding across the double bond or by amidifying with a carboxylate group. For example, a polymer of the formula

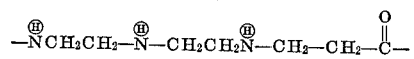

having the labile hydrogens indicated by the circles which may react with a monomer

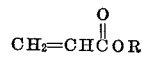

for example as follows:

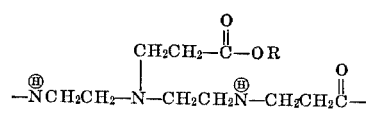

This can further polymerize to form a polymer of the type

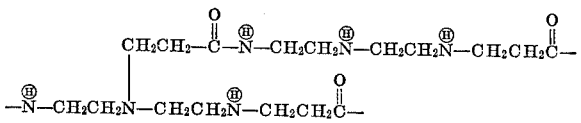

Further cross-linking can also take place in a similar manner by reactions of the labile hydrogens. The amido hydrogen is believed to be less labile than the amino hydrogen. Cross-links can grow from one or more points indicated by the encircled hydrogens.

In addition, cross-linking may also take place by amidification of the labile hydrogens, for example, as follows:

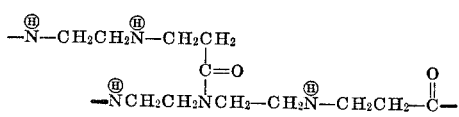

which can further react with amino monomers or polymers and/or unsaturated monomers or polymers to form branched polymers, for example:

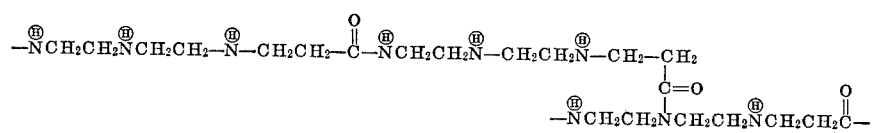

Further reaction and cross-links may also occur at the other labile hydrogens in a similar manner for example, in accord with the following formula:

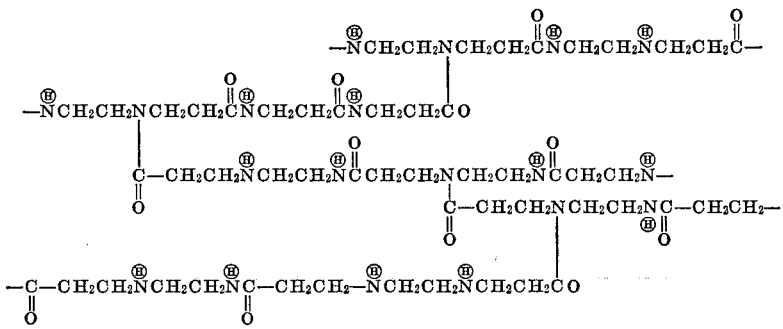

Polymers may also be formed in the following manner:

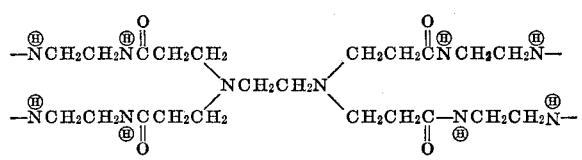

and the polymer can continue to grow out of any of the points indicated by the encircled hydrogen, particularly at the more labile non-amido hydrogens.

The above formulae are presented to indicate possible methods by which crosslinking or other reactions can occur but it is not to be assumed that these are the sole means by which crosslinking or other reactions may occur.

The polymerization is carried out at any suitable temperature. Temperatures up to the decomposition points of reactants and products such as up to 200° C. or higher have been employed. In practice, one generally carries out the polymerization by heating the reactants below 100° C., such as 80–90° C., for a suitable period of time, such as a few hours. Where an acrylic-type ester is employed, the progress of the reaction can be judged by the removal of the alcohol in forming the amide. During the early part of the reaction alcohol is removed quite readily below 100° C. in the case of a low boiling alcohol such as methanol or ethanol. As the reaction slows, the temperature is raised to push the polymerization to completion and the temperatures may be raised to 150–200° C. toward the end of the reaction. Removal of alcohol is a convenient method of judging the progress and completion of the reaction which is generally continued until no more alcohol is evolved. Based on removal of alcohol, the yields are generally stoichiometric. In more difficult polymerizations, yields of at least 95% are generally obtained.

The reaction time involved can vary widely depending on a wide variety of factors. For example, there is a relationship between time and temperature. In general, lower temperature demands longer times. In practice I employ times of from about 2 to 30 hours, such as 5 to 25 hours, and preferably 3 to 10 hours.

I have found that although one can employ a solvent, the reaction can be run without the use of any solvent. In fact, where a high degree of cross-linking is desired, it is preferable to avoid the use of a solvent and most particularly to avoid a polar solvent such as water. However, taking into consideration the effect of solvent on the reaction, where desired, any suitable solvent can be employed, whether organic or inorganic, polar or non-polar.

The polyamines employed in this invention include those of the following formula:

$$NH_2(AN)_nH$$
       H where $n$ is for example 1–8 or greater, where A is a divalent radical for example straight chained or branched

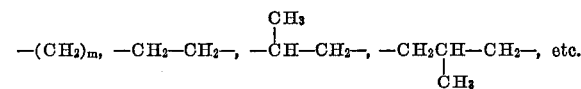

and $m$ is for example 2–10 or greater. These include the following:

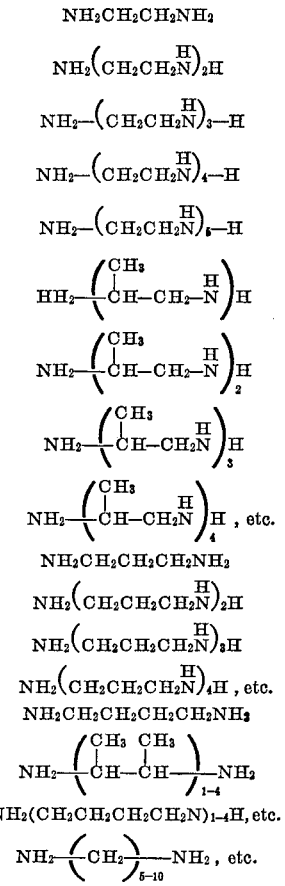

Other examples include the following alkylated polyamines for example of the formula

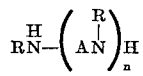

where the R's are H or a substituted group, such as alkyl, alkenyl, alkinyl, aryl, etc. The preferable type is of the formula

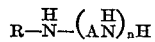

(R is straight chain or branched)

Examples include the following:

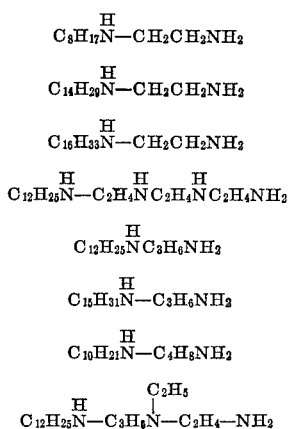

Other suitable amines are exemplified by:

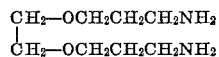

Preacylated amines can also be employed provided the resulting amino amide has at least two labile-non-amido hydrogens, for example

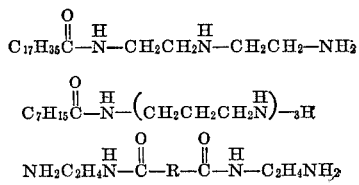

Aromatic polyamines can also be employed, for example:

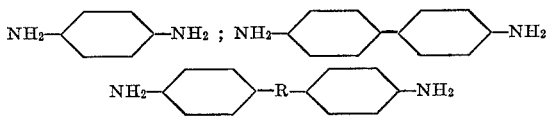

where R is O, S

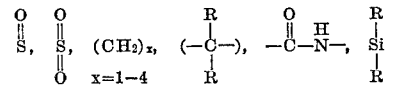

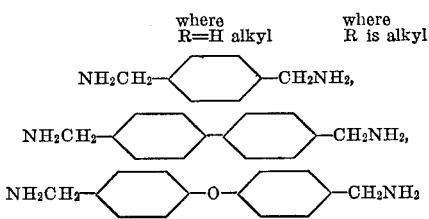

etc. or substituted derivatives thereof for example, alkyl, alkoxy, halo, etc. derivatives.

Thus, any polyamine, whether aliphatic, cycloaliphatic, aromatic, heterocyclic, etc., can be employed provided it is capable of adding across the acrylic double bond and amidifying with the acrylic carboxylic group.

The acrylate-type compound employed herein has for example the following formula:

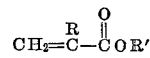

where R is for example hydrogen or an alkyl group, such as methyl, and R' is hydrogen or an alkyl group, capable of being removed so as to form an amido group, for example methyl, ethyl, propyl, isopropyl, butyl, sec-butyl, tert-butyl, aryl, hexyl, etc. In the preferred embodiments these compounds are acrylic and methacrylic esters such as methyl or ethyl acrylate, methyl or ethyl methacrylate.

The type of polymer varies with reaction conditions. For example, a more linear polymer is formed where substantially equimolar amounts of the unsaturated carboxylate and polyamine are reacted. The presence of excesses of one or the other of the reactant tends to yield a polymer which is more cross-linked than that obtained where substantially equimolar amounts of reactants are employed. Where for economic or other reasons a cross-linked polymer using excess amine is desired, I generally employ a molar excess of the polyamine of about at least 10%, such as 10–300%, or greater, for example 25–200%, but preferably an excess of about 50–100%. For more efficient cross-linking I prefer to use an excess of carboxylated material since a cleaner reaction ensues. For example, a molar excess of about 10–100% or greater such as 10–50% but preferably an excess of 30–50%, of the carboxylated material. Larger excess can be employed if desired.

In summary, without considering other factors, equimolar amounts of reactants tend to produce a more linear polymer whereas excesses of either reactants tend to yield a more cross-linked polymer. The actual molar excess of either reactant employed will depend on the cross-linking desired and excesses of as high as 300% polyamine may be employed. I generally employ a molar excess of polyamine ranging from about 30 to 300%, but preferably about 50 to 200% or a carboxylate excess of 20 to 50%. However, it should be noted that the higher the polyamine (i.e. in greater the number of amino groups on the molecule) the greater the statistical probability of cross-linking since, for example, a tetraalkylenepentamine, such as tetraethylene pentamine $$NH_2(CH_2CH_2\overset{H}{N})_4H$$

has more labile hydrogens than ethylene diamine.

In certain instances, in addition to the reactants, it may be desirable to incorporate specific cross-linking agents into the reaction. In general, these cross-linking agents are polyfunctional carboxylates or polyfunctional amines (i.e. having a functionality of at least three reactive groups), since the presence of at least three functional groups enhances cross-linking. To conform to the type of linking already present in the polymer, it is desirable to have this cross-linking either by amidification or by amine-addition to unsaturated groups, or both. In practice one may employ the following types of cross-linking agents:

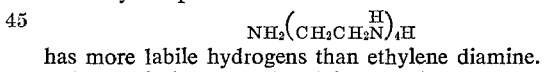

where A is alkylene (straight chained or branched) for example methylene, ethylene, propylene, etc., and R is hydrogen or alkyl, for example $$N[(CH_2)_{2-3}\overset{O}{\overset{\|}{C}}OCH_3]_3$$

or other lower alkyl esters of nitrilo tricarboxylic acids.

Another cross-linking agent is

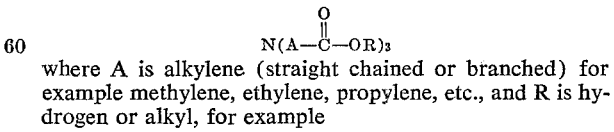

for example where the $n$'s which may be the same or different are 1–5 or greater, R is hydrogen or alkyl and the $(CH_2)_n$ groups may be straight chained or branched, for example,

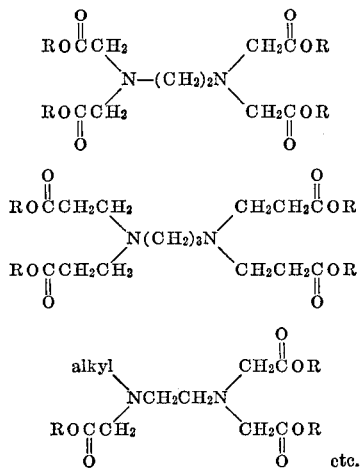

In addition where lower polyamines are employed such as ethylenediamine or phenylenediamine, polyamines such as those of the formula

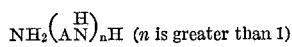  ($n$ is greater than 1)

can be employed as cross-linking agents where A is an alkylene group, for example, ethylene, propylene, butylene, etc. Since the higher the amine the greater the number of labile hydrogens, it may be desirable to employ in conjunction with diamines, triamines or higher amines such as

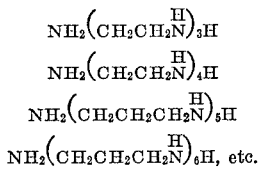

Alkylated derivatives thereof can also be employed provided the resulting polyamine has at least three labile cross-linking hydrogens such as for example

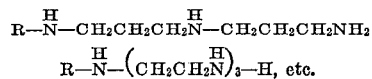

, etc.

where R is a hydrocarbon group such as alkyl, alkenyl, etc.

One type of cross-linking polyamine which is advantageously employed in this invention is an analogue of the nitrilo-tricarboxylic acids, i.e. nitrilo-triamine of the formula $$N(ANH_2)_3$$

where A is for example alkylene (straight chain and branched) such as ethylene, propylene, butylene, etc. for example

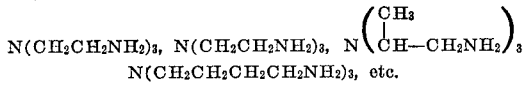

Nitrilotripropionic acid (A) and nitrilotriethylamine (B) may form the following types of cross-linking networks:

(A) 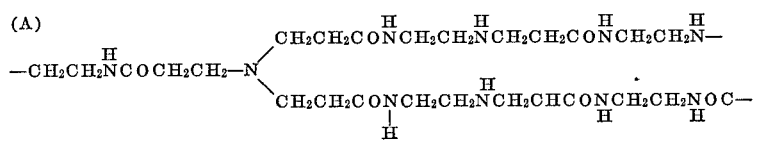

(B) 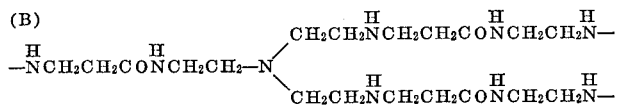

The amount of cross-linking agents employed can vary widely depending on the particular cross-linking agent, the system, the reaction conditions, the amount of cross-linking desired, etc. For example, with nitrilotricarboxylic acid, nitriloamines, etc., I may employ at least about 1% of cross-linking agent, such as 1 to 29% but preferably 10 to 20%, based on total weight of reactants.

The following examples are presented for purposes of illustration and not of limitation.

EXAMPLE 1

Methyl acrylate (100 g., 1.0 mole) and ethylene diamine (120.2 g., 2 moles) were mixed together with ice-cooling in a 500 ml. round-bottomed flask. The flask and contents were placed in an electrically-heated oil bath and fitted with a precision built Vigreux fractionating column having a theoretical plate equivalent of circa 10. The column was topped with a water-cooled partial take-off still head capable of allowing the system to be placed under reduced pressure. A receiving flask was attached to the still head and the reaction flask was stirred magnetically.

The reaction mixture was now heated at 80–90° C. for one-half hour. At this point, methanol begins to form freely and was now fractionally distilled from the mixture. The oil bath temperature was raised to 125–130° and was held at this point for 5 hours until 32 g. methanol had formed. The excess ethylene diamine was now removed by distilling from the mixture; the last traces were removed over several hours at reduced pressure (50–60°/40–50 mm.). The residue was taken up in methanol (125 ml.) and poured into stirred ether (500 ml.). After settling, the supernatant liquid was removed by decantation and the residue was dried in a vacuum oven at reduced pressure (aspirator) and room temperature. The product was a solid, yellow, polymeric material which had hygroscopic tendencies and was consequently highly water soluble.

EXAMPLE 2

Methyl methacrylate (100 g., 1 mole) and ethylene diamine (120.2 g., 2 moles) were mixed and reacted in the apparatus described in Example 1. The reaction took 15 hours to reach completion and 29 g. methanol (theory 32 g.) was formed. The excess ethylene diamine was removed by fractional distillation at atmospheric pressure, followed by several hours at a reduced pressure (50–55°/25–50 mm.) and a further reduced pressure (150–185°/1–4 mm.). The crude product was a reddish-yellow polymeric solid (126.4 g., i.e. 98.5% yield) which was hygroscopic when ground to a powder.

EXAMPLE 3

Methyl acrylate (43.0 g., 0.5 mole) and diethylene triamine (103.2 g., 1 mole) were placed in a 250 ml. round-bottomed flask using ice-water cooling. The flask was fitted with a magnetic stirrer, and a water-cooled partial-take-off still head leading into a receiving flask. The still head had a side-arm to enable vacuum to be applied and a thermometer socket. The flask and contents were heated by means of an electrically heated oil bath.

The reaction mixture was heated to an oil-bath temperature of 135° which was gradually raised to 195° over 9.5 hours. A total of 15.6 g. methanol distilled from the reaction mixture (theory 16 g.). The temperature was reduced and excess diethylene triamine was removed by distillation under conditions of gradually increasing temperature and gradually reducing pressure (85–175°/25–4 mm.). The product was an amber-colored highly viscous polymer which was water soluble and the yield was essentially 100%.

EXAMPLE 4

Methyl acrylate (86.1 g., 1 mole) and ethylene diamine (42.0 g., 0.7 mole) were mixed and reacted in an apparatus already described in Example 3. The reaction took 4.75 hours; 24.8 g. methanol were formed and the oil-bath temperature was varied between 125–135°. No excess amine was observed when the methanol formation had ceased. The product was dissolved in anhydrous methanol (200 ml.) and poured into stirred ether (500 ml.). After settling, the supernatant upper layer was decanted from the lower viscous bottom layer. The bottom layer was now dried in a vacuum oven under reduced pressure (aspirator) at 50–60°. A yellow, hygroscopic polymeric material was obtained as a solid foam.

EXAMPLE 5

Methyl acrylate (43.0 g., 0.5 mole) and trimethyl tripropionate (10.5 g., 0.036 mole) were added to ethylene diamine (30 g., 0.5 mole) in a 250 ml. round-bottomed flask with ice-water cooling. The reactants were then heated (in the apparatus described in Example 3) at 120° with a gradual increase in temperature to 180° over 4.25 hours. A total of 18.3 g. methanol was formed during this period. The weight of the final product was 63.5 g. (i.e., 98.5% yield). The formed polymer was a solid, transparent glass at room temperature but was still highly soluble in water.

EXAMPLE 6

Methyl acrylate (86.1 g., 1 mole) and Amine #1 (100 g., 0.85 mole equivalent—this amine was a mixture of polyamines such as diethylene triamine, triethylene tetramine, tetraethylene pentamine, etc.) were mixed and reacted in a 250 ml. flask as described in Example 3, and reacted for 2.5 hours at a temperature that was gradually raised from 110° to 140°. A total of 26.4 g. methanol was obtained, and the weight of crude product obtained was 159.3 g. (i.e., 99.4% yield).

Other polymers similarly prepared according to the procedure of the examples described above, are presented in the following table in order to avoid repetitive details. Based on the acrylic-type monomer, the yields obtained range from 90–100%.

In the tables MA is methylacylate, ED is ethylenediamine, DET is diethylenetriamine, A#1 is a mixture of diethylenetriamine, triethylenetetramine, and tetraethylenepentamine, NTP is the methyl ester of nitrilotripropionic acid, NTA is the methyl ester of nitrilotriacetic acid and NA is nitrilotriethylamine, HMD is hexamethylenediamine, PD is phenylenediamine, LPD is N-lauryl propylenediamine, and MMA is the methyl ester of methacrylic acid and PPD is N-pentadecyl propylenediamine.

TABLE I

| Ex. | 1 Acid | Mol | 2 Polyamine | Moles | 3 Cross-linking agent | Moles |
|---|---|---|---|---|---|---|
| 1 | MA | 1.0 | ED | 0.5 | | |
| 2 | MA | 1.0 | ED | 1.0 | | |
| 3 | MA | 1.0 | ED | 1.5 | | |
| 4 | MA | 1.0 | ED | 2.0 | | |
| 5 | MA | 1.0 | ED | 2.5 | | |
| 6 | MA | 1.0 | ED | 0.7 | | |
| 7 | MA | 1.0 | ED | 1.0 | NTP | 0.04 |
| 8 | MA | 1.0 | ED | 1.5 | NTP | 0.94 |
| 9 | MA | 1.0 | ED | 0.8 | NTA | 0.04 |
| 10 | MA | 1.0 | ED | 1.0 | NA | 0.04 |
| 11 | MA | 1.0 | DET | 0.5 | | |
| 12 | MA | 1.0 | DET | 0.8 | | |
| 13 | MA | 1.0 | DET | 2.0 | | |
| 14 | MA | 1.0 | DET | 1.0 | NTP | 0.04 |
| 15 | MA | 1.0 | DET | 1.0 | NTA | 0.04 |
| 16 | MA | 1.0 | DET | 1.3 | NA | 0.04 |
| 17 | MA | 1.0 | A#1 | 0.5 | | |
| 18 | MA | 1.0 | A#1 | 0.8 | | |
| 19 | MA | 1.0 | A#1 | 1.0 | | |
| 20 | MA | 1.0 | A#1 | 2.0 | | |
| 21 | MA | 1.0 | A#1 | 1.0 | NTP | 0.04 |
| 22 | MA | 1.0 | A#1 | 1.3 | NTA | 0.08 |
| 23 | MA | 1.0 | A#1 | 1.5 | NA | 0.04 |
| 24 | MA | 1.0 | HMD | 0.5 | | |
| 25 | MA | 1.0 | HMD | 0.8 | | |
| 26 | MA | 1.0 | HMD | 1.0 | NTP | 0.04 |
| 27 | MA | 1.0 | HMD | 1.0 | NTA | |
| 28 | MA | 1.0 | PD | 0.5 | | |
| 29 | MA | 1.0 | PD | 0.8 | | |
| 30 | MA | 1.0 | PD | 1.5 | | |
| 31 | MA | 1.0 | PD | 1.0 | NTP | 0.04 |
| 32 | MA | 1.0 | PD | 1.0 | NA | 0.04 |
| 33 | MA | 1.0 | LPD | 0.5 | | |
| 34 | MA | 1.0 | LPD | 0.8 | | |
| 35 | MA | 1.0 | LPD | 1.0 | | |
| 36 | MA | 1.0 | LPD | 2.0 | | |
| 37 | MA | 1.0 | LPD | 1.0 | NTP | 0.08 |
| 38 | MA | 1.0 | LPD | 1.5 | NTP | 0.04 |
| 39 | MA | 1.0 | LPD | 1.0 | NTA | 0.04 |
| 40 | MA | 1.0 | LPD | 1.3 | NA | 0.04 |
| 41 | MA | 1.0 | PPD | 0.5 | | |
| 42 | MA | 1.0 | PPD | 0.7 | | |
| 43 | MA | 1.0 | PPD | 1.0 | | |
| 44 | MA | 1.0 | PPD | 2.0 | | |
| 45 | MA | 1.0 | PPD | 1.0 | NTP | 0.04 |
| 46 | MA | 1.0 | PPD | 1.0 | NA | 0.04 |

TABLE II

| Ex. | 1 Acid | Mol | 2 Poly-amine | Moles | 3 Cross-linking agent | Moles |
|---|---|---|---|---|---|---|
| 1 | MMA | 1.0 | ED | 0.5 | | |
| 2 | MMA | 1.0 | ED | 0.7 | | |
| 3 | MMA | 1.0 | ED | 1.5 | | |
| 4 | MMA | 1.0 | ED | 2.0 | | |
| 5 | MMA | 1.0 | ED | 2.5 | | |
| 6 | MMA | 1.0 | ED | 3.0 | | |
| 7 | MMA | 1.0 | ED | 1.0 | NTP | 0.04 |
| 8 | MMA | 1.0 | ED | 1.5 | NTP | 0.04 |
| 9 | MMA | 1.0 | ED | 2.0 | NTP | 0.04 |
| 10 | MMA | 1.0 | ED | 1.0 | NA | 0.04 |
| 11 | MMA | 1.0 | DET | 0.5 | | |
| 12 | MMA | 1.0 | DET | 0.7 | | |
| 13 | MMA | 1.0 | DET | 2.0 | | |
| 14 | MMA | 1.0 | DET | 1.0 | NTP | 0.04 |
| 15 | MMA | 1.0 | DET | 1.0 | NTP | 0.04 |
| 16 | MMA | 1.0 | DET | 1.3 | NA | 0.08 |
| 17 | MMA | 1.0 | A$1 | 1.0 | | |
| 18 | MMA | 1.0 | A$1 | 0.8 | | |
| 19 | MMA | 1.0 | A$1 | 1.5 | | |
| 20 | MMA | 1.0 | A$1 | 1.0 | NTP | 0.04 |
| 21 | MMA | 1.0 | A$1 | 1.3 | NTA | 0.04 |
| 22 | MMA | 1.0 | A$1 | 1.5 | NA | 0.04 |
| 23 | MMA | 1.0 | HMD | 0.5 | | |
| 24 | MMA | 1.0 | HMD | 0.9 | | |
| 25 | MMA | 1.0 | HMD | 1.0 | NTP | 0.04 |
| 26 | MMA | 1.0 | HMD | 1.0 | NTA | 0.04 |
| 27 | MMA | 1.0 | PD | 0.5 | | |
| 28 | MMA | 1.0 | PD | 0.8 | | |
| 29 | MMA | 1.0 | PD | 1.5 | | |
| 30 | MMA | 1.0 | PD | 1.0 | NTP | 0.04 |
| 31 | MMA | 1.0 | PD | 1.0 | NA | 0.04 |
| 32 | MMA | 1.0 | LPD | 0.5 | | |
| 33 | MMA | 2.0 | LPD | 0.9 | | |
| 34 | MMA | 1.0 | LPD | 1.5 | | |
| 35 | MMA | 1.0 | LPD | 2.0 | | |
| 36 | MMA | 1.0 | LPD | 1.0 | NTP | 0.04 |
| 37 | MMA | 1.0 | LPD | 1.5 | NTP | 0.04 |
| 38 | MMA | 1.0 | LPD | 1.0 | NTP | 0.04 |
| 39 | MMA | 1.0 | LPD | 1.3 | NA | 0.04 |
| 40 | MMA | 1.0 | PPD | 0.5 | | |
| 41 | MMA | 1.0 | PPD | 0.7 | | |
| 42 | MMA | 1.0 | PPD | 1.0 | | |
| 43 | MMA | 1.0 | PPD | 2.0 | | |
| 44 | MMA | 1.0 | PPD | 1.0 | NTP | 0.04 |
| 45 | MMA | 1.0 | PPD | 1.0 | NA | 0.04 |

Breaking oil-in-water emulsions

The polymers of this invention can also be used in a process for resolving or separating emulsions of the oil-in-water class, by subjecting the emulsion to these polymers.

Emulsions of the oil-in-water class comprise organic oily materials, which, although immiscible with water or aqueous or non-oily media, are distributed or dispersed as small drops throughout a continuous body of non-oily medium. The proportion of dispersed oily material is in many and possibly most cases a minor one.

Oil-field emulsions containing small proportions of crude petroleum oil relatively stably dispersed in water or brine are representative oil-in-water emulsions. Other oil-in-water emulsions include: steam cylinder emulsions, in which traces of lubricating oil are found dispersed in condensed steam from steam engines and steam pumps, wax-hexane-water emulsions, encountered in de-waxing operations in oil refining; butadiene tar-in-water emulsions, in the manufacture of butadiene from heavy naphtha by cracking in gas generators, and occurring particularly in the wash box emulsions of such systems; emulsions of "flux oil" in steam condensate produced in the catalytic dehydrogenation of butylene to produce butadiene; styrene-in-water emulsions, in synthetic, rubber plants; synthetic latex-in-water emulsions, in plants producing copolymer butadiene-styrene or GRS synthetic rubber; oil-in-water emulsions occurring in the cooling water systems of gasoline absorption plants; pipe press emulsions from steam-actuated presses in clay pipe manufacture; emulsions of petroleum residues-in-diethylene glycol, in the dehydration of natural gas.

In other industries and arts, emulsions of oily materials in water or other non-oily media are encountered, for example, in sewage disposal operations, synthetic resin emulsions paint formulation, milk and mayonnaise processing, marine ballast water disposal, and furniture polish formulation. In cleaning the equipment used in processing such products, diluted oil-in-water emulsions are inadvertently, incidentally, or accidentally produced. The disposal of aqueous wastes is, in general, hampered by the presence of oil-in-water emulsions.

Essential oils comprise non-saponifiable materials like terpenes, lactones, and alcohols. They also contain saponifiable esters or mixtures of saponifiable and non-saponifiable materials. Steam distillation and other production procedures sometimes cause oil-in-water emulsions to be produced, from which the valuable essential oils are difficult to recover.

In all such examples, a non-aqueous or oily material is emulsified in an aqueous or non-oily material with which it is naturally immiscible. The term "oil" is used herein to cover broadly the water-immiscible materials present as dispersed particles in such systems. The non-oily phase obviously includes diethylene glycol, aqueous solutions, and other non-oily media in addition to water itself.

The foregoing examples illustrate the fact that, within the broad genus of oil-in-water emulsions, there are at least three important sub-genera. In these, the dispersed oily material is respectively non-saponifiable, saponifiable, and a mixture of non-saponifiable and saponifiable materials. Among the most important emulsions of non-saponifiable material in water are petroleum oil-in-water emulsions. Saponifiable oil-in-water emulsions have dispersed phases comprising, for example, saponifiable oils and fats and fatty acids, and other saponifiable oily or fatty esters and the organic components of such esters to the extent such components are immiscible with aqueous media. Emulsions produced from certain blended lubricating compositions containing both mineral and fatty oil ingredients are examples of the third sub-genus.

Oil-in-water emulsions contain widely different proportions of dispersed phase. Where the emulsion is a waste product resulting from the flushing with water of manufacturing areas or equipment, the oil content may be only a few parts per million. Resin emulsion paints, as produced, contain a major proportion of dispersed phase. Naturally-occurring oil-field emulsions of the oil-in-water class carry crude oil in proportions varying from a few parts per million to about 20%, or even higher in rare cases.

The present invention is concerned with the resolution of those emulsions of the oil-in-water class which contain a minor proportion of dispersed phase, ranging from 20% down to a few parts per million. Emulsions containing more than about 20% of dispersed phase are commonly of such stability as to be less responsive to the present polymers, possibly because of the appreciable content of emulsifying agent present in such systems, whether intentionally incorporated for the purpose of stabilizing them, or not.

Although the present invention relates to emulsions containing as much as 20% dispersed only material, many if not most of them contain appreciably less than this proportion of dispersed phase. In fact, most of the emulsions encountered in the development of this invention have contained about 1% or less of dispersed phase. It is to such oil-in-water emulsions having dispersed phase volumes of the order of 1% or less to which the present process is particularly directed. This does not mean that any sharp line of demarcation exists and that, for example, an emulsion containing 1.0% of dispersed phase will respond to the process, whereas one containing 1.1% of the same dispersed phase will remain unaffected; but that, in general, dispersed phase proportions of the order of 1% or less appear most favorable for application of the present process.

In emulsions having high proportions of dispersed phase, appreciable amounts of some emulsifying agent are probably present, to account for their stability. In the case of more dilute emulsions, containing 1% or less of dispersed phase, there may be difficulty in accounting for their stability on the basis of the presence of an emulsifying agent in the conventional sense. For example, steam condensate, frequently contains very small proportions of refined petroleum lubricating oil in extremely stable dispersion; yet neither the steam nor the refined hydrocarbon oil would appear to contain anything suitable to stabilize the emulsion. In such cases, emulsion stability must probably be predicated on some basis other than the presence of an emulsifying agent.

The present process, as stated above, appears to be effective in resolving emulsions containing up to about 20% of dispersed phase. It is particularly effective on emulsions containing not more than 1% of dispersed phase, which emulsions are the most important, in view of their common occurrence.

The present process is not believed to depend for its effectiveness on the application of any simple laws, because it has a high level of effectiveness when used to resolve emulsions of widely different composition, e.g., crude or refined petroleum in water or diethylene glycol, as well as emulsions of oily materials like animal or vegetable oils or synthetic oily materials in water.

Some emulsions are by-products of manufacturing procedures in which the composition of the emulsion and its ingredients is known. In many instances, however, the emulsions to be resolved are either naturally-occurring or are accidentally or unintentionally produced; or in any event they do not result from a deliberate or premeditated emulsification procedure. In numerous instances, the emulsifying agent is unknown and as a matter of fact an emulsifying agent, in the conventional sense, may be felt to be absent. It is obviously very difficult or even impossible to recommend a resolution procedure for the treatment of such latter emulsions, on the basis of theoretical knowledge. Many of the most important applications of the present process are concerned with the resolution of emulsions which are either naturally-occurring or are accidentally, unintentionally, or unavoidably produced. Such emulsions are commonly of the most dilute type, containing about 1% or less of dispersed phase, although concentrations up to 20% are herein included, as stated above.

The process which constitutes the present invention consists in subjecting an emulsion of the oil-in-water class to the action of the polymer of the kind described, thereby causing the oil particles in the emulsion to coalesce sufficiently to rise to the surface of the non-oily layer (or settle to the bottom, if the oil density is greater), when the mixture is allowed to stand in the quiescent state after treatment with the polymer reagent or demulsifier.

Applicability of the present process can be readily determined by direct trial on any emulsion, without reference to theoretical considerations. This fact facilitates its application to naturally-occurring emulsions, and to emulsions accidentally, unintentionally, or unavoidably produced; since no laboratory experimentation, to discover the nature of the emulsion components or of the emulsifying agent, is required.

The present reagents are useful because they are able to recover the oil from oil-in-water class emulsions more advantageously and at lower cost than is possible using other reagents or other processes. In some instances, they have been found to resolve emulsions which were not economically or effectively resolvable by any other known means.

These polymeric reagents are useful in undiluted form or diluted with any suitable solvent. Water is commonly found to be a highly satisfactory solvent, because of its ready availability and negligible cost; but in some some cases, non-aqueous solvents such as aromatic petroleum solvent may be found preferable. The products themselves may exhibit solubilities ranging from rather modest water-dispersibility to full and complete dispersibility in that solvent. Because of the small proportions in which my reagents are customarily employed in practicing my process, apparent solubility in bulk has little significance. In the extremely low concentrations of use they undoubtedly exhibit appreciable water-solubility of water-dispersibility as well as oil-solubility or oil-dispersibility.

These polymeric reagents may be employed alone, or they may in some instances be employed to advantage admixed with other and compatible oil-in-water demulsifiers.

This process is commonly practiced simply by introducing sufficient but minor proportions of the reagent into an oil-in-water class emulsions, agitating to secure distribution of the reagent and incipient coalescence, and letting stand until the oil phase separates. The proportion of reagent required will vary with the character of the emulsion to be resolved. Ordinarily, proportions of reagent required are from about at least about 1 p.p.m. to 10,000 p.p.m. such as 3–1,000 p.p.m., for example 5–300 p.p.m., but preferably 5–50 p.p.m., based on the volume of emulsions treated; but more is sometimes required. Since the economics of the process are important, no more is employed than is required for effective separation. I have found that such factors as reagents, feed rate, agitation and settling time are somewhat interrelated. For example, I have found that if sufficient agitation of proper character is employed, the settling time is shortened materially. On the other hand, if satisfactory agitation is not available, but extended settling time is, the process is equally productive of satisfactory results.

Agitation may be achieved by any available means. In many cases, it is sufficient to introduce the polymeric reagent into the emulsion and use the agitation produced as the latter flows through a conduit or pipe. In some cases, agitation and mixing are achieved by stirring together or shaking together the emulsion and reagent. In some instances, distinctly improved results are obtained by the use of air or other gaseous medium. Where the volume of gas employed is relatively small and the conditions of its introduction relatively mild, it behaves as a means of securing ordinary agitation. Where aeration is effected by introducing a gas directly under pressure or from porous plates or by means of aeration cells, the effect is often importantly improved, until it constitutes a difference in kind rather than degree. A sub-aeration type flotation cell, of the kind commonly employed in ore beneficiation operations, is an extremely useful adjunct in the application of my reagents to many emulsions. It frequently accelerates the separation of the emulsion, reduces reagent requirements, or produces an improved effluent. Sometimes all three improvements are observable.

Heat is ordinarily of little importance in resolving oil-in-water class emulsions with my reagents. Still there are some instances where heat is a useful adjunct. This is especially true where the viscosity of the continuous phase of the emulsion is appreciably higher than that of water.

In some instances, importantly improved results are obtained by adjusting the pH of the emulsion to be treated, to an experimentally determined optimum value.

The polymeric reagent feed rate also has an optimum range, which is sufficiently wide, however, to meet the tolerances required for the variances encountered daily in commercial operations. A large excess of reagent can produce distinctly unfavorable results.

The manner of practicing the present invention is clear from the foregoing description. However, for completeness the following non-limiting specific examples are included for purposes of illustration.

An oil-in-water petroleum emulsion was treated as follows:

A series of four bottles of the emulsion were treated with the polymeric reagents in the following concentrations 30, 15, 7.5 and 3.75 p.p.m., based on the emulsion. A commercial oil-in-water demulsifier was run as a control and at the same concentrations as the polymeric reagent after sufficient agitation, in the form of 130 shakes per minute for 5 minutes. The bottles were observed and comparisons drawn between the effect of the polymeric reagent and the commercial demulsifier as to which gave the clear water layer.

In all cases employing the polymeric reagents of Table I, Examples 1–23; and Table II, Examples 1–22, it was found that the polymeric reagents of this invention were far superior to the commercial demulsifier. After selecting the demulsifier by the above procedure, the demulsifier is employed in a commercial application. The following illustrates commercial applications of this invention.

Commercial Example I.—My process is practiced on location by flowing the well fluids, consisting of free crude oil, oil-in-water emulsion, and natural gas, through a gas separator, then to a steel tank of 5,000-barrel capacity. In this tank, the oil-in-water emulsion falls to the bottom and is so separated from the free oil. The oil-in-water emulsion is withdrawn from the bottom of this tank, and the demulsifier selected is introduced into the stream at this point. Depending on the emulsion, the proper proportion of demulsifier is employed.

The chemicalized emulsion flows to a second tank, mixing being achieved in the pipe. In the second tank it is allowed to stand quiescent. Clear water is withdrawn from the bottom of this tank, separated oil from the top.

Commercial Example II.—This is an example of the application of the aeration step in my process. The emulsion is a naturally-occurring petroleum oil-in-water emulsion. It is placed in a sub-aeration flotation cell of the type commonly employed in the ore beneficiation industry. The stirring mechanism is started to begin introduction of the air, and at the same time the mixture of the selected demulsifier is added in the proper proportions of demulsifier to emulsion. Clear examples are taken from the machine.

This example illustrates the beneficial influence of the aeration technique. In most cases, it accelerates separation. In some, it permits use of smaller proportions of reagent; but in some cases, it achieves resolution, whereas, in absence of its use, satisfactory separation may not be achieved in reasonable time with reasonable reagent consumption.

My reagents have likewise been successfully applied to other oil-in-water class emulsions, of which representative examples have been referred to above. Their use is, therefore, not limited to crude petroleum-in-water emulsions.

Other derivatives

These products may be further reacted to form derivatives thereof, for example, they may be oxyalkylated with alkylene oxides such as ethylene oxide, propylene oxide, butylene oxide, octylene oxide, alone or in combination; with styrene oxide, glycide, methyl glycide, allyl glycidyl ether, glycidyl isopropyl ether, glycidyl phenylether, diepoxides, polyepoxides, etc.

They may be reacted with alkylene imines such as ethyleneimine, propylene imine, etc., dialkylaminoepoxypropane of the structure

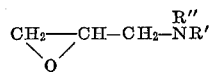

where the R's are alkyl, etc.

They may be acylated with nonocarboxylic acids, such as aromatic acids, fatty acids, aliphatic acids, etc. and polycarboxylic acids aliphatic dicarboxylic acids, aromatic dicarboxylic acids for example diglycolic, phthalic, succinic, etc., acids.

These compounds may also be treated with more than one agent, for example, they may be partially acylated, then oxyalkylated, partially oxyalkylated then acylated, etc.

Salts may be formed of these polymers as derivatives for example salts of either organic or inorganic acids such as acetic acid, glycollic acid, fatty acids, benzoic acid, etc. HCl, sulfuric acids, etc.

Having thus described my invention, what I claim as new and desire to obtain by Letters Patent is:

1. A process of breaking oil-in-water emulsions characterized by treating the emulsion with an aminoamido polymer characterized by a reaction product of
   (A) at least one polyamine selected from the group consisting of
      (1) a polyamine having the formula

where
   $n$ is 1–8,
   A is a radical selected from the group consisting of (a) $-(CH_2)_m-$ where $m$ is 2–10

(b) $\begin{array}{c} CH_3 \\ | \\ -CH-CH_2- \end{array}$ (c) $-CH_2CH-CH_2-$, and $\begin{array}{c} | \\ CH_3 \end{array}$ (d) $\left( \begin{array}{cc} CH_3 & CH_3 \\ | & | \\ -CH-CH- \end{array} \right)_m$ where $m$ is 1–4

(2) a polyamine having the formula

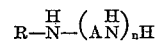

where
   $n$ is 1–8,
   R is an alkyl group having 8–16 carbon atoms,
   A is $-(CH_2)_m-$ where $m$ is 2–10, (3) $\begin{array}{c} C_2H_5 \\ | \\ C_{12}H_{25}N-C_3H_6N-C_2H_4NH_2 \end{array}$ (4) $\begin{array}{c} CH_2-OCH_2CH_2CH_2NH_2 \\ | \\ CH_2-OCH_2CH_2CH_2NH_2 \end{array}$ (5) a preacylated polyamine selected from the group consisting of (a) $C_{17}H_{35}\overset{O}{\underset{\|}{C}}-\overset{H}{\underset{|}{N}}-CH_2CH_2NH-CH_2CH_2-NH_2$ (b) $C_7H_{15}\overset{O}{\underset{\|}{C}}-\overset{H}{\underset{|}{N}}-\left(CH_2CH_2CH_2\overset{H}{\underset{|}{N}}\right)_3H$, and (c) $NH_2C_2H_4\overset{H}{\underset{|}{N}}-\overset{O}{\underset{\|}{C}}-R-\overset{O}{\underset{\|}{C}}-\overset{H}{\underset{|}{N}}-C_2H_4NH_2$ (6) an aromatic polyamine selected from the group consisting of (a) $NH_2-\langle\phantom{x}\rangle-NH_2$ (b) $NH_2-\langle\phantom{x}\rangle-\langle\phantom{x}\rangle-NH_2$ (c) $NH_2-\langle\phantom{x}\rangle-R-\langle\phantom{x}\rangle-NH_2$ where R is a member selected from the group consisting of $S$, $\overset{O}{\underset{\underset{O}{\|}}{\underset{\|}{S}}}$, $-C_2H_4-$ $-C_3H_6-$, $-C_4H_8-$, $-CH_2-$ $\begin{array}{c} alkyl \\ | \\ -C- \\ | \\ alkyl \end{array}$, $\begin{array}{c} -CH- \\ | \\ alkyl \end{array}$ $$-\overset{O}{\underset{\|}{C}}-\overset{H}{\underset{}{N}}, \text{ and } \overset{\text{alkyl}}{\underset{\text{alkyl}}{\underset{|}{Si}}}$$

(d) 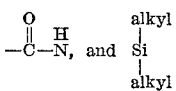

(e) NH₂CH₂-⟨⟩-⟨⟩-CH₃NH₂

(f) 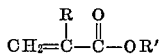

(7) alkyl derivatives of (6),
(8) alkoxy derivatives of (6), and
(9) halo derivatives of (6), and (B) an acrylate-type compound having the formula $$CH_2=\overset{R}{\underset{|}{C}}-\overset{O}{\underset{\|}{C}}-OR'$$

group consisting of hydrogen and methyl and R' is a radical selected from the group consisting of methyl, ethyl, propyl, isopropyl, butyl, sec-butyl, tert-butyl, aryl and hexyl, wherein units of the polyamine and the acrylate-type compound are in the polymer backbone and at least a nitrogen atom is attached to a β carbon of the acrylate-type compound.

2. The process of claim 1 wherein said amino-amido polymer is cross-linked.

3. The process of claim 1 wherein (B) of said amino-amido polymer is

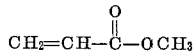

4. The process of claim 3 wherein said amino-amido polymer is cross-linked.

5. The process of claim 1 wherein (B) of said amino-amido polymer is

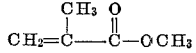

6. The process of claim 5 wherein said amino-amido polymer is cross-linked.

References Cited

UNITED STATES PATENTS 3,445,441   5/1969   Rushton _____ 260—89.5

JOHN DAVID WELSH, Primary Examiner

D. SILVERSTEIN, Assistant Examiner

U.S. Cl. X.R.

252—344, 390, 392; 260—89.5